April 15, 1958 C. A. BOGGS 2,831,068

MINIATURE TAPE RECORDING MECHANISM

Filed March 5, 1954 2 Sheets-Sheet 1

CHESTER A. BOGGS,
INVENTOR.

HUEBNER, BEEHLER,
WORREL & HERZIG,
ATTORNEYS.

BY Vernon D. Beehler

April 15, 1958 C. A. BOGGS 2,831,068

MINIATURE TAPE RECORDING MECHANISM

Filed March 5, 1954 2 Sheets-Sheet 2

CHESTER A. BOGGS,
INVENTOR.

HUEBNER, BEEHLER,
WORREL & HERZIG,
ATTORNEYS.

BY Vernon D. Beehler

United States Patent Office 2,831,068

Patented Apr. 15, 1958

2,831,068

MINIATURE TAPE RECORDING MECHANISM

Chester A. Boggs, Los Angeles, Calif.

Application March 5, 1954, Serial No. 414,299

2 Claims. (Cl. 179—100.2)

The invention relates to tape recorders of the magnetic variety and has particular reference to the production of a tape recorder in an extremely small package battery operated and small enough so that the case containing both batteries and the entire tape recording mechanism together with reels for the tape can be placed in a pocket of ordinary size in a suit of clothes.

More particularly the invention relates to a driving means for miniature tape recording mechanisms which is extremely simple in its design and operation and which likewise embodies a simplified but accurate control so as to assure a constant speed of operation during the recording cycle.

Magnetic tape recorders have been developed and produced in considerable variety to the extent that magnetic sound heads have become standard to a substantial degree as have also the electronic circuits necessary for their operation. For the most part magnetic tape recorders, though made in portable packages, have emphasized versatility in their design and operation to an extent such that even though portable, the features built into them have made relatively bulky and heavy packages having a size and weight far beyond any notion of a size and weight adapted to fit in a pocket. Such scattered attempts as have been made to reduce the size of the package have emphasized precision and accuracy to an unnecessarily great extent so that the ultimate cost of small size tape recorders has been far beyond the means of the average purchaser.

It is therefore among the objects of the invention to produce a new and improved tape recorder mechanism sufficiently small so that it can be contained within a pocket of average size in a suit of clothes but without sacrifice to the extent that the mechanism will not record voice frequencies and even frequencies beyond the voice range with sufficient fidelity and accuracy to be dependable as a sound record under all normal conditions.

Another object of the invention is to provide a new and improved miniature size magnetic tape recorder which is positive in its action and at the same time sufficiently inexpensive in its design as to be within the reach of a very large proportion of the purchasing public.

Still another object of the invention is to provide a new and improved miniature magnetic tape recorder mechanism which is self-contained to the extent that it carries its own battery unit comprehended within the container for the recording mechanism.

Still further among the objects of the invention is to provide a new and improved miniature size magnetic tape recorder mechanism which includes a simple, inexpensive and sensitive governor control especially adapted for accurate operation on a low power circuit, the invention further including among its objects a drive train constructed along simplified lines wherein a portion of the power is transmitted frictionally through a single shaft to different points of application with the frictional surfaces balanced for the purpose of maintaining a constant tension on the tape as it is passed across the recording head and through the mechanism to make certain that the tape does not overrun the ability of the take-up reel to receive the tape.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
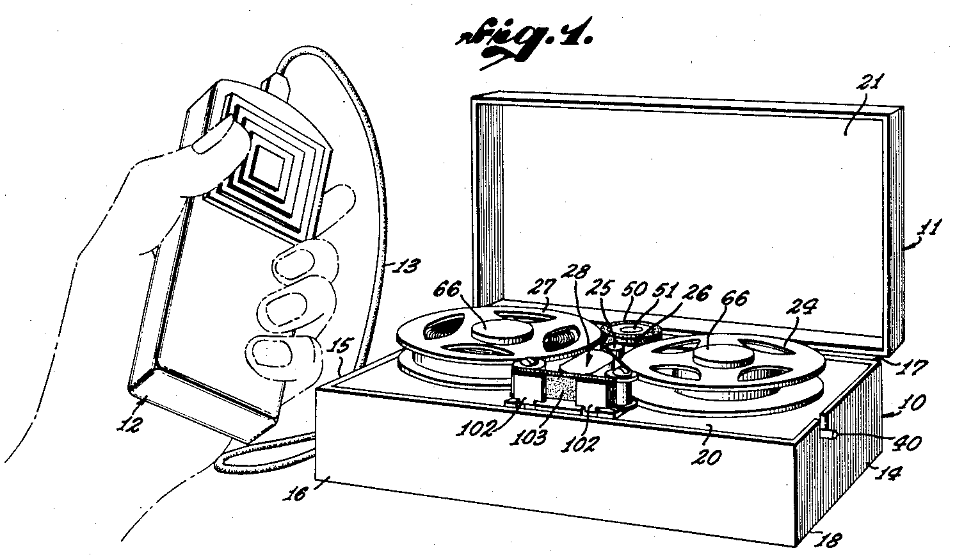
Figure 1 is a front perspective view showing a container for the mechanism opened and ready for operation together with the hand microphone attached thereto.

In the form of the invention chosen for the purpose of illustration the miniature or pocket-size tape recorder mechanism is shown as being housed within a container 10 adapted to be closed by means of a cover 11 and having a size sufficiently small to fit in a pocket in some instances as small as a vest pocket. The relative size of the container is comparable to the size of the container of Figure 1 when compared to a human hand there shown. The tape recording mechanism is adapted for use with a conventional combined hand microphone and amplifier unit 12 adapted to be connected to the mechanism by means of a double wire cable 13.

More particularly the container has end walls 14 and 15 and side walls 16 and 17 A bottom 18 defines a lower wall for a lower chamber 19 which has for its upper wall a partition or platform 20 forming a mounting base. When the cover 11 is closed the partition 20 may be defined as separating the container into two parts namely, the lower chamber 19 and an upper chamber 21. Housed within the lower chamber 19 of the container is a set of batteries 22 which supplies a low voltage source of electric current for operating a motor 23. The motor in turn through a gear train serves to rotate a take-up reel 24 in a clockwise direction, as viewed in Figures 1 and 2, and to rotate a pulley or spool 25 in a clockwise direction as viewed in Figure 2, for the purpose of drawing a magnetic sound tape 26 from a pay-out reel 27 through a sound recording head indicated generally by the reference character 28. The pay-out and take-up reels are kept small enough in size to fit comfortably within the container and are likewise attached in rotatable position by releasable means so that the tape may be employed as a double track tape for which purpose the reels can be removed and reversed in their positions after the tape has been run through once with a recording having been made on only one-half the width of the tape.

One terminal of the battery circuit connects to a wire 29 and thence through a switch 30 and wire lead 31 to a compact condenser 32 and to the motor 23. One wire 33 from the condenser connects to the panel 20 as a ground. Another wire 34 comprises a portion of the motor circuit and connects to a binding post 35. The motor circuit includes as parts thereof an armature 36 resilient in character and adapted to make and break at a point 37 mounted on the binding post 35. A wire 39 at the opposite end of the armature connects to the battery 22 (not shown). A switch button 40 can be manipulated by finger pressure to turn the motor circuit off and on.

The double wire cable 13 connects to a terminal box 41 from which a cable 42 forms a permanent direct connection to the sound head 28.

The motor 23 mounts on a bracket 43 by means of an arm 44, the bracket 43 being attached to the underside of the partition 20 by means of bolts 45.

A motor shaft 46' within a housing 46 extends horizontally outwardly from the motor and has a gear reducer 47 connected thereto. A drive shaft member 48 conects to and is driven by the gear reducer 47. The drive shaft member is mounted vertically relative to the partition 20 but may be contained and journalled in the gear reducer. The drive shaft may be described as having at its lower end within the chamber 19 a pulley 49 and as having at its upper end within the chamber 29 the pulley 25 already identified.

Figure 2:
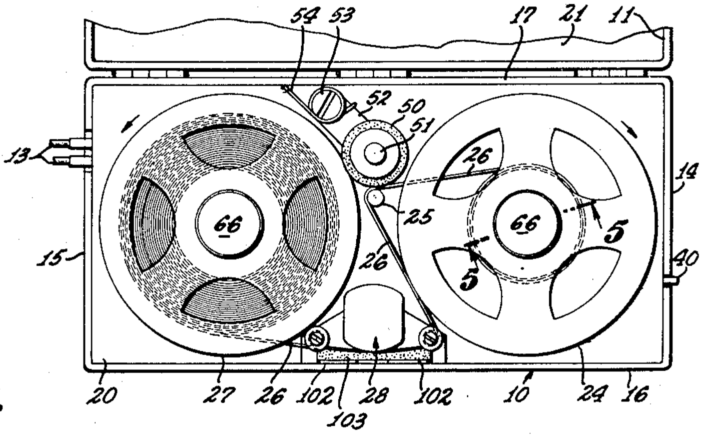
Figure 2 is a plan view of the container and mechanism illustrated in Figure 1.
Figure 3:
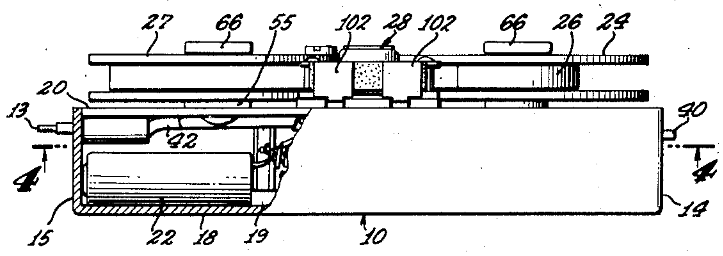
Figure 3 is a front elevational view of the device partially broken away to show the interior.

As the pulley 25 is rotated by the drive shaft 48 in a clockwise direction, as viewed in Figures 1 and 2, the pulley rotates in frictional rotating contact with a frictioned surface idler roller 50. The roller is rotatably mounted on an axle 51 on a lever 52 pivotally mounted by the screw 53 to the partition 20 and resiliently urged by means of a spring 54 into engagement with the pulley 25. The last identified pulley may be designated a tape feed pulley. When the tape feed pulley 25 and friction surface idler roller 50 rotate in the manner described, the tape 26 will be pulled through the sound recording head 28 from the pay-out roll 27. Rotation of the pay-out roll may be retarded slightly by use of a friction washer 55 so that there will always be a very slight tension in the tape between the pay-out roller and the sound head.

Figure 4:
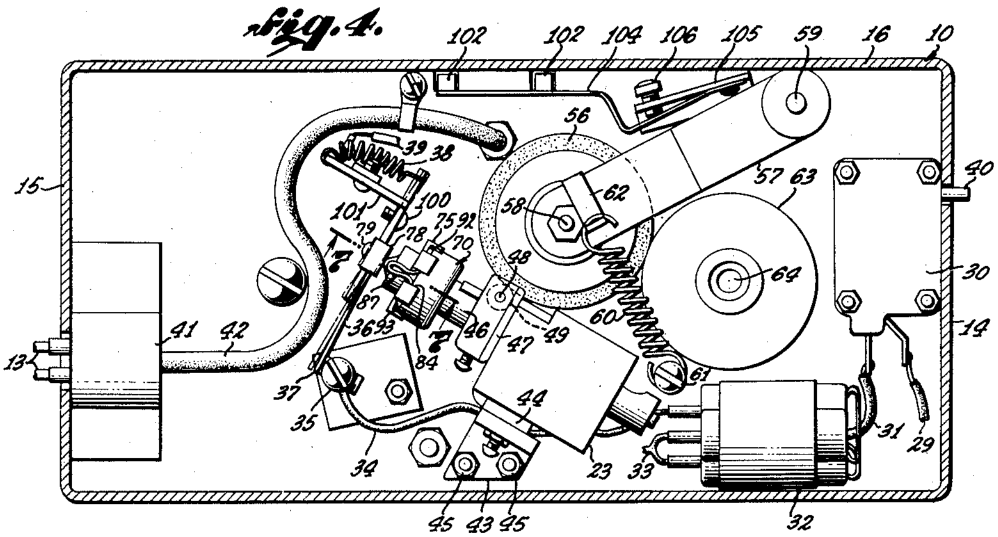
Figure 4 is a horizontal sectional view of the interior mechanism taken on the line 4—4 of Figure 3.

As shown to best advantage in Figure 4, the pulley 49 is in rotatable frictional engagement with a frictionally surfaced idler pulley 56 rotatably mounted on a pivotally supported arm 57 at the axis 58. The arm 57 is pivoted about a stub shaft 59 to the underside of the partition 20. A coiled spring 60 drawing between a bolt or spring keeper 61 on the lower side of the partition 20 and a bracket 62 of the arm 57 tends to permanently urge the friction outer roller 56 into frictional engagement with the pulley 49 and also with a take-up reel pulley 63. The take-up reel pulley 63 is keyed to a shaft 64 which in turn is keyed to the take-up reel 24 by means of a key 65. A cap 66 adapted to frictionally engage an upper portion of the key 65 serves to hold the take-up reel 24 in place during operation.

Figure 5:
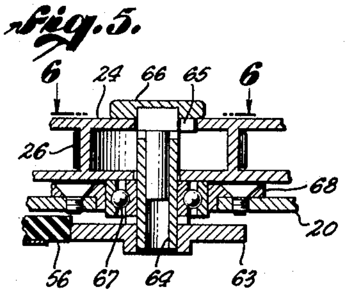
Figure 5 is a fragmentary cross-sectional view taken on the line 5—5 of Figure 2.
Figure 6:
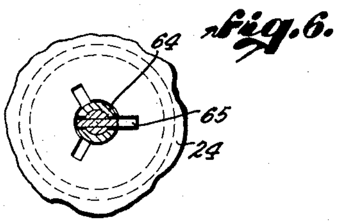
Figure 6 is a fragmentary plan view taken on the line 6—6 of Figure 5.

To assure smoothness of operation there is provided a ball bearing mechanism 67 between a suitable fitting 68 and the partition 20 and the shaft 64. These details are readily visible in Figure 5. It should be noted that the diameters of the pulleys 50 and 56 can be made such with relation to their respective frictionally contacting pulleys 25 and 49 and further with respect to the diameter of the take-up reel pulley 63 that the take-up reel will be rotated slightly faster than the rate of travel of the tape 26 past the pulley 25 in order that the tape will not overrun the ability of the take-up reel to receive it. By having the pulleys frictionally surfaced, they permit a certain slippage so that the tape, though only a paper tape, will not be broken.

It is essential that the speed of travel of the tape 26 past the sound head be kept constant. For this purpose a governor device 70 is provided. The governor device 70 as shown is mounted on a free end of the motor shaft 46'. In general the governor device when the motor is running will tend to be urged endwise into engagement with the armature 36 so that when the motor runs too fast, the armature will be moved to break contact at the point 37, thereby causing a temporary instantaneous discontinuance of the supply of power to the motor, in which event the motor will slow down until the governor returns to a position permitting remaking of the motor circuit.

Figure 9:
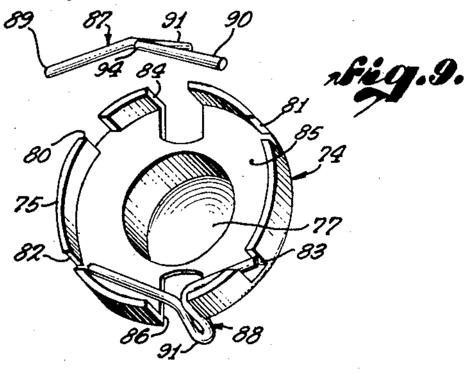
Figure 9 is an exploded perspective view of portions of the governor mechanism.

More particularly the construction of the governor device includes a collar 71 keyed to the motor shaft 46'. The collar presents an annular flat shoulder 72 facing a free end 95 of the motor shaft. A cap 74, as indicated generally, is shown in detail in Figure 9. The cap includes a flange 75 having an inside circumference sufficient to permit it to slide freely over the circumferential exterior of the collar 71. A raised mid-portion 76 fits loosely over the free end 95 of the motor shaft but with a sufficient closeness of fit to be partially guided by the motor shaft as the cap shifts endwise to a slight degree. a somewhat conical boss 77 on the raised portion is adapted to engage a finger 78 attached in turn to the armature 36 by means of a suitable screw 79.

The flange 75 is provided with a pair of recesses 80 and 81 on one side and a second pair of recesses 82 and 83 on the opposite side. Between the pair of recesses 80, 81 is an opening 84 which extends not only through the flange 75 but part way through a flat ring 85. Also between the pair of recesses 82 and 83 is a second similar opening 86.

Figure 7:
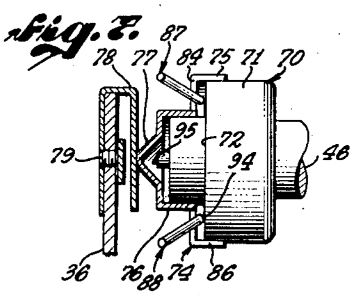
Figure 7 is a longitudinal sectional view of a governor mechanism taken on the line 7—7 of Figure 4, when the governor is at rest.
Figure 8:
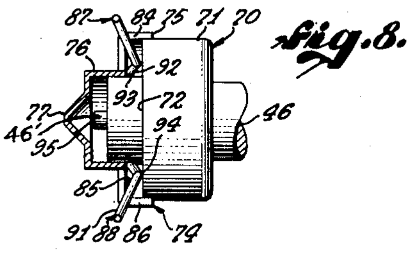
Figure 8 is a view similar to Figure 7 showing the condition of governor parts during operation.

For operation the governor device depends upon two centrifugally tiltable governor elements 87 and 88. These governor elements are identical and comprise legs 89 and 90 located between a folded mid-portion 91. The governor elements are especially shaped at the junction of the folded mid-portion 91 to the legs as best illustrated in Figures 7 and 8. As shown there is a slight angular disposition of the mid-portion 91 with respect to the legs so that ends 92 of the legs are adapted to bear against an edge 93 of the flat ring 85. Furthermore, a point 94 at the junction of inner ends of the legs 93 to the folded mid-portion 91 is adapted to ride upon the shoulder 72 of the collar 71.

The projecting end 95 may be employed if needed to assist in centering action of the cap 76 at certain stages of the cycle.

In the assembly of the governor device the governor elements 87 and 88 are placed beneath the cap 74 and the cap 74 slid into position over the collar 71. None of these parts are permanently fastened together. The armature 36 may then be attached by means of a screw 100 to a bracket 101 which is in turn mounted upon the partition 20. The armature 36 therefore serves to retain the governor parts in their position on the motor shaft. Since the armature 36 closes contact at the point 37, when the switch 30 is closed power from the battery actuates the motor. As the motor runs up to speed, the pulley 25 rotates to draw the tape 26 from the pay-out reel 27 through the sound head 28 at a speed established by the governor device 70. At the same time the take-up reel 24 is rotated at a speed slightly faster so as to maintain tension on the tape between the pulley 25 and the take-up reel. The governor device will initially have the position illustrated in Figure 7. It is designed so that the speed of operation of the motor will be very slightly in excess of the speed needed to maintain a proper speed of travel of the tape. As the motor tends to increase in speed, the folded mid-portion 91 of the governor elements will tend to move or tilt outwardly as a result of centrifugal force. This will cause endwise movement of the ends 93 of the legs of the governor elements. This action will tend to move the conical boss on the cap outwardly endwise against the finger 78 which will tend to lift the armature 36 in order to break contact at the point 37 for the purpose already described in some detail. Rotaticn of the motor shaft will thereby be governed to a proper speed.

After the tape has been removed from the pay-out reel 27 and entirely wound upon the take-up reel 24, caps 66 may be removed and the pay-out reel placed in the position of the take-up reel and the take-up reel being placed in the position of the pay-out reel. The take-up reel will, however, be reversed face for face so that an opposite edge of the tape 26 will be adjacent the top of the partition 20. Following a conventional practice the sound head 28 may then be employed to impress a magnetic sound track on the opposite side of the tape from that impressed with the first passage of the tape through the sound head.

To improve control of the mechanism over passage of tape past the sound head and to the take-up reel, there may be provided adjustable fingers 102 adapted to bear against the tape and press it against a shoe 103. The fingers, as shown particularly in Figure 4, are carried by an arm 104 which in turn is attached by a bracket 105 to the underside of the partition 20. An adjusting screw 106 may be manipulated to change the tension of the fingers on the tape.

It should be noted that advantageous results are achieved when the battery power (not shown) for the audio system remains enclosed in the container for the microphone unit 12 which is of metal and gives added insulation from an electronic standpoint. The separate metal case also acts as an aid in isolating the interference of the drive motor in the tape recorder. Added isolation is gained by separating the electronics from the motor and keeping it in the case with the microphone.

There has accordingly been described a miniature tape recording mechanism particularly simple in its design and construction so that all of the parts can be constructed to miniature dimensions and in such form that frictional resistance may be kept to such a minimum as to permit operation of the mechanism by a small low power battery self-contained within the same container as that employed to house the mechanism.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A pocket size magnetic tape recorder comprising a covered container, a take-up reel and a pay-out reel rotatably mounted at opposite ends of the container, an electric battery mounted in the container, a battery-actuated motor in the container having a motor shaft, a governor on the motor shaft, a make and break switch in the motor circuit operatively associated with the governor, a magnetic sound head having a tape guide therein and mounted on the container, a tape feed drive shaft mounted in driven relationship with the motor shaft having friction drive means thereon and friction-surfaced idler means mounted in the container operably associated with the sound head and the take-up reel resiliently urged against the drive shaft.

2. A pocket size magnetic tape recorder comprising a covered container having a partition between upper and lower chambers therein, a take-up reel and a pay-out reel rotatably mounted on the partition at opposite ends of the upper chamber, an electric battery mounted in the lower chamber, a battery-actuated motor in the lower chamber having a motor shaft, a governor on the motor shaft, a make-and-break switch in the motor circuit operatively associated with the governor, a magnetic sound head having a tape guide therein and mounted in the upper chamber, a tape feed drive shaft extending between said chambers and in driven relationship with the motor shaft and having a tape feed pulley in the upper chamber adapted to engage the tape, a friction-surfaced idler roller mounted in the upper chamber in a position resiliently urged against the pulley, a second friction-surfaced idler pulley mounted in the lower chamber in driven relationship with said drive shaft and in resiliently urged friction driving relationship with said take-up reel, means operatively associated with the tape and the sound head providing a friction drag on the tape and friction means operatively associated with the pay-out reel providing a friction drag thereon, said reels being reversible in position for recordation in double track operation.

References Cited in the file of this patent

UNITED STATES PATENTS

| | | |
|---|---|---|
| 2,589,369 | Granquist | Mar. 18, 1952 |
| 2,616,982 | Gray | Nov. 4, 1952 |
| 2,639,333 | Howell et al. | May 19, 1953 |
| 2,673,320 | Oliwa | Mar. 23, 1954 |
| 2,713,618 | McNabb | July 19, 1955 |
| 2,733,069 | Frost et al. | Jan. 31, 1956 |